March 14, 1944.  C. B. GREEN  2,344,298
RESISTOR DEVICE
Filed Jan. 21, 1942

INVENTOR
C. B. GREEN
BY
Walter C. Kiesel
ATTORNEY

Patented Mar. 14, 1944

2,344,298

UNITED STATES PATENT OFFICE 2,344,298

RESISTOR DEVICE

Charles B. Green, West Orange, N. J., assignor to Bell Telephone Laboratories, Incorporated, New York, N. Y., a corporation of New York Application January 21, 1942, Serial No. 427,535

1 Claim. (Cl. 219—19)

This invention relates to resistor devices and more particularly to constructional features thereof.

In resistors of the type known as thermistors, i. e., those having a relatively high absolute value of resistance-temperature coefficient, control of thermal characteristics and conditions is of particular importance. For example, if the thermistor is used to measure temperature, care must be taken that the thermistor current does not have an appreciable heating effect on the thermistor or that compensation for this effect be made. On the other hand, if one is interested in the resistance variation due to current heating, account must be taken of ambient temperature. One way of doing this is to employ heating or cooling means in the immediate vicinity of the thermistor to maintain some predetermined ambient temperature. The present invention involves certain structural features that combine to provide the necessary means for adequate ambient temperature control in thermistor devices.

An object of this invention is to construct a small bead type thermistor having ambient temperature control means that are accurate and relatively rugged.

One feature of the invention lies in structure that maintains accurate spacing between the heater and the thermistor with which it is associated.

Another feature of this invention resides in a coil type heater adapted to maintain its proper configuration under operating conditions.

Other and further objects and features of this invention will be understood more fully and clearly from the following description of illustrative embodiments thereof taken in connection with the appended drawing in which.

In the embodiment of the invention, illustrated in Figs. 1, 2 and 3, 10 is a small thermistor element having conductive leads 11 and 12 secured thereto. For example, 10 may be a bead of semiconductive material having a high resistance-temperature coefficient such as a heat treated mixture of a suitable combination of two or more of the oxides of manganese, nickel, cobalt and copper. The leads 11 and 12 may be fine wires of platinum or platinum-iridium alloy or the like embedded in the bead.

Figure 4:
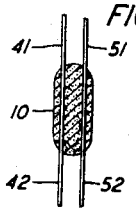
Figs. 4 and 5 show respectively different modified forms of thermistor elements.
Figure 5:
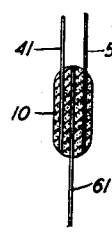

The thermistor element 10 may be provided with more than two leads as illustrated in Figs. 4 and 5. In Fig. 4 the leads 41, 42, and 51, 52, are respectively part of the same conductors. The four leads may also consist of four separate conductors or three may be used as leads 41, 51 and 61 in Fig. 5.

Figure 1:
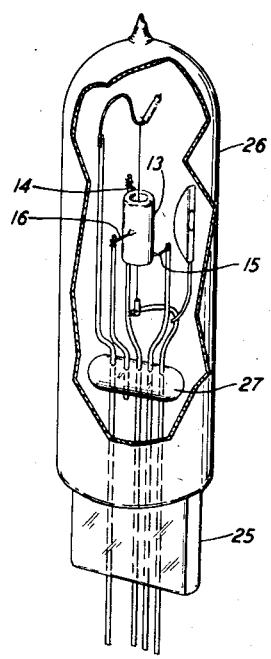
Fig. 1 is a perspective view of an illustrative form of the invention in which the elements are enclosed in a suitable envelope.
Figure 2:
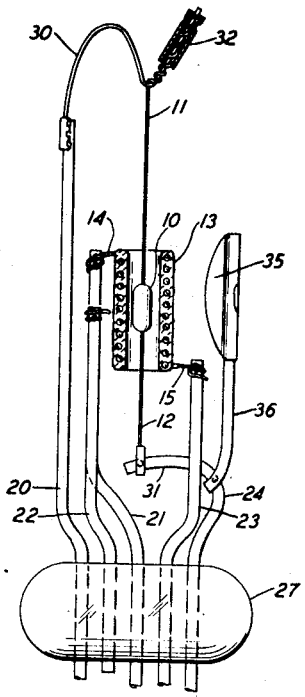
Fig. 2 is an enlarged view of the device without the envelope, certain parts being sectioned to show details of the invention.
Figure 3:
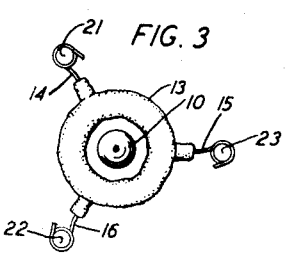
Fig. 3 is an enlarged top view of the head thermistor and associated elements shown in Figs. 1 and 2.

The heater 13, as illustrated in Figs. 1, 2 and 3, may be a coil of fine wire impregnated with a ceramic cement. A suitable wire is one comprising an alloy of nickel and chromium. The coil may have two end leads 14 and 15 respectively and a center tap 16. As shown in Fig. 3, the end leads and center tap are radially spaced at approximately 120 degrees for a purpose to be later described.

The coil structure 13 may be made by winding the proper number of turns of wire on a mandrel and then impregnating the resulting coil with a suitable ceramic cement. A convenient way of applying the cement is to spray it on the coil, coating each turn and filling the spaces between turns. The cement may then be dried and baked. This cement may be made of an aggregate such as aluminum oxide and a binder comprising one or more of the glass forming compounds.

Figure 6:
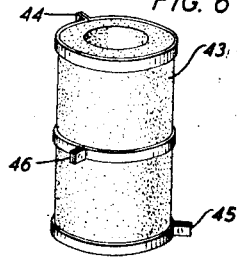
Figs. 6 and 7 are views of a modified form of heater.
Figure 7:
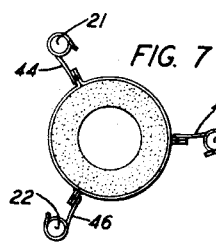

Instead of a coil, the heater may be, as shown in Figs. 6 and 7, a cylinder or tube 43 of resistance material having end connectors 44 and 45 and a center connector 46. Although a three point heater suspension has been found particularly suitable more than three supports may be used on either form of heater as the particular requirements demand.

A plurality of supports 20, 21, 22, 23 and 24, four of which are in the illustrated modification, secured in the press 25 of the enclosing envelope 26, are maintained in spaced relation by member 27. The envelope 26 may be of glass and member 27 may be a glass bead. The supports should be of an electrically conductive material that can be properly sealed in the glass. An alloy wire of suitable proportions of copper, nickel and iron, may be used.

As indicated in the drawing, the supports 20 to 24, inclusive, which are embedded in the bead 27 are bent into suitable configurations to support the several elements. The upper ends of supports 21, 22, and 23 are respectively adjacent the top, center and bottom of coil 13. The supports are bent so that their upper portions are equally spaced around said coil as particularly indicated in Fig. 3. Coil lead 14 is secured to the end of support 21, tap 16 to support 22 and lead 15 to support 23 by suitable means such as a weld. As illustrated in Fig. 7 the connectors 44, 46 and 45 may be connected in like manner to supports 21, 22 and 23 respectively if heater 43 is employed.

In the modification illustrated, support 22 does not extend to the outside of the envelope. This is because no electrical connection is to be made to the tap 16 or 46, which acts here only as the third member of a three point support. The supports 21 and 23, which are connected to the end leads or connectors, serve also as connecting conductors to an external circuit. Obviously, if an electrical connection to tap 16 or 46 is desired, support 22 may be extended to the outside of the envelope. If the heater is to be supported at more than three points, additional supports must be provided and the spacing arrangement made accordingly. For example, with a four point heater support, the supports would be spaced at 90 degree intervals around the heater axis.

Attached to the top of support 20, which in the modification illustrated extends above the other supports, is a spring 30 to which is secured one lead 11 of the thermistor element 10. The other thermistor lead 12 is secured to a bent over portion 31 of the support 24. The spring 30 and portion 31 are oriented so that the thermistor leads lie substantially along the axis of coil 13. The leads 11 and 12 are so secured to 30 and 31 that the thermistor 10 is supported substantially at the center of the heater 13 or 43. The spring 30 is held under slight flexure so that the leads 11 and 12 are under tension. The leads may be welded to 30 and 31. In the case of spring 30 and lead 11, both are ordinarily so fine that an enclosing sleeve 32 of metal is employed to obtain a suitable joint. The wire 11 is wrapped around the spring 30 adjacent its end, the sleeve 32 applied and a spot weld made through the sleeve, lead and spring. Final adjustment of thermistor location and lead tension may be made by slightly bending the portion 31 of the support 24 to the proper position.

If a three or four lead thermistor element is employed, the support structure is modified accordingly. For example, with a thermistor such as the one shown in Fig. 4, there would be two resilient members like the spring 30 and two adjustable support portions like 31. Obviously, various support combinations may be provided to suit particular requirements without departing from the basic structural features set forth in the modification illustrated and particularly described.

The member 35 mounted on support 24 by an auxiliary support 36 is a holder for the getter used in envelope evacuation.

The constructional features of the device of this invention combine to produce a resistor device that is relatively rugged and capable of maintaining proper interelement spacing under rather severe conditions of use. Since the regulatory functions required of this type of thermistor must be accurately performed, the novel structure herein disclosed is of considerable importance in actual circuit applications.

Although this invention has been disclosed by means of a particular illustrative embodiment thereof, it is to be understood that modifications may be made therein within the spirit and scope of the appended claim.

What is claimed is:

In a resistor device including a small resistor unit having a pair of leads projecting oppositely therefrom, an orificed, radiant heater, and an envelope for enclosing the unit and heater, means for supporting the unit and heater within said envelope comprising a plurality of conductors sealably mounted in spaced relation through a portion of said envelope, said heater comprising a plurality of turns of wire wound in a cylindrical coil with a center tap and end connections, said coil impregnated with an insulating material rendering it relatively rigid, the axial length of said coil exceeding the length of the unit in the direction of the projecting leads, the heater having its end connections and center tap secured respectively to three of said conductors spaced approximately 120 degrees apart around the axis of said coil, one of the leads of said resistor unit being connected to a portion of another of the supporting conductors, said portion lying approximately at right angles to the axis of the coil, and the other of said leads connected to a bowed spring member having one end in line with said axis and the other secured to still another of the support conductors, said right angle conductor portion and spring member being adjusted to apply a slight tension to the leads and to suspend the resistor unit within the orifice of said heater approximately at its center.

CHARLES B. GREEN.